(12) United States Patent
Venkatesan

(10) Patent No.: US 6,928,474 B2
(45) Date of Patent: Aug. 9, 2005

(54) USING A PROBABILITY ASSOCIATIVE MATRIX ALGORITHM TO MODIFY WEB PAGES

(75) Inventor: Thyagarajan Venkatesan, Karnataka State (IN)

(73) Assignee: Honeywell International, Inc., Morristown, NJ (US)

( * ) Notice: Subject to any disclaimer, the term of this patent is extended or adjusted under 35 U.S.C. 154(b) by 884 days.

(21) Appl. No.: 09/737,113

(22) Filed: Dec. 14, 2000

(65) Prior Publication Data

US 2002/0124075 A1 Sep. 5, 2002

(51) Int. Cl.$^7$ .................... G06F 15/173; G06F 15/16; G06F 7/00

(52) U.S. Cl. .................... 709/224; 709/203; 709/219; 705/10; 707/6; 707/10

(58) Field of Search .................... 709/203, 219, 709/224, 226, 231, 235, 236; 705/10; 707/6, 10

(56) References Cited

U.S. PATENT DOCUMENTS 6,037,935 A * 3/2000 Bates et al. .................. 715/760
6,115,718 A * 9/2000 Huberman et al. .......... 707/102
6,131,110 A * 10/2000 Bates et al. .................. 709/203

(Continued)

OTHER PUBLICATIONS

Nakajima, Amane and Aoki, Yoshinori. "Transformation of Web Event Sequences for Analysis of Users' Web Operation," IEEE Conference on Systems, Man, and Cypernetics, vol. 4, pp. 111–116, Oct. 12–15, 1999.*

Su, Zhong, et al. "WhatNext: A Prediction System for Web Requests using N–gram Sequence Models," Proceedings of the First Intl Conference on Information Systems Engineering, vol. 1, pp. 214–221, Jun. 19–21, 2000.*

Dua, Sumeet, et al. "Discovery of Web Frequent Patterns and User Characteristics from Web Access Logs: A Framework for Dynamic Web Personalization," 3rd IEEE Symp on Application–Specific Systems and Software Engineering Technology, Mar. 25, 2000, pp. 3–8.*

Akoi, Yoshinori et al. "Web Operation Recorder and Player," Seventh Intl Conf on Parallel and Distributed Systems, Jul. 4–7, 2000, pp. 501–508.*

Cicerone, Serafino, et al. "Supporting a focus+context interaction style for Spatial Databases," First Intl Conf on Web Information Systems Engineering, vol. 1, pp. 328–335, Jun. 19–21, 2000.*

Oda, Toshikane. "Moment Analysis for Traffic Associated with Markovian Queueing Systems," IEEE Transactions on Communications, vol. 39, Issue 5, pp. 737–746, May 1991.*

Costa, Oswaldo L. V. and Aya, Julio C.C. "Monte Carlo Methods for Optimal Control of Discrete– Time Markovian Jump Linear Systems," $39^{th}$ IEEE Conf on Decision and Control, vol. 2, pp. 1183–1188, Dec. 12–15, 2000.*

Primary Examiner—Jason R. Cardone
Assistant Examiner—Melvin H. Pollack
(74) Attorney, Agent, or Firm—Schwegman, Lundberg, Woessner & Kluth, P.A.

(57) ABSTRACT

A web based technique for predicting future web navigation sequences of users visiting a web site includes, in one example embodiment, a web server having browsable web pages including products and services offered by a business. A web-monitoring tool monitors each web navigation sequence of web navigation sequences performed by each user while browsing the web pages of the web site. A PAM analyzer analyzes each of the monitored web navigation sequences to predict the web navigation sequences of future users visiting the web site. A web site administrator implements changes to the web site based on the analysis of the monitored web navigation sequences by the PAM analyzer to enhance user friendliness of the web site.

27 Claims, 3 Drawing Sheets

U.S. PATENT DOCUMENTS

| | | | |
|---|---|---|---|
| 6,182,097 B1 * | 1/2001 | Hansen et al. | 715/526 |
| 6,182,133 B1 * | 1/2001 | Horvitz | 709/223 |
| 6,188,673 B1 * | 2/2001 | Bauer et al. | 370/252 |
| 6,321,206 B1 * | 11/2001 | Honarvar | 705/7 |
| 6,353,822 B1 * | 3/2002 | Lieberman | 707/3 |
| 6,418,471 B1 * | 7/2002 | Shelton et al. | 709/227 |
| 6,438,593 B1 * | 8/2002 | Khanna et al. | 709/224 |
| 6,449,604 B1 * | 9/2002 | Hansen et al. | 707/1 |
| 6,502,094 B1 * | 12/2002 | Gvily et al. | 707/5 |
| 6,507,867 B1 * | 1/2003 | Holland et al. | 709/219 |
| 6,553,410 B2 * | 4/2003 | Kikinis | 709/218 |
| 6,606,657 B1 * | 8/2003 | Zilberstein et al. | 709/224 |
| 6,661,431 B1 * | 12/2003 | Stuart et al. | 715/733 |
| 6,667,751 B1 * | 12/2003 | Wynn et al. | 715/833 |
| 6,697,825 B1 * | 2/2004 | Underwood et al. | 715/530 |
| 6,742,030 B1 * | 5/2004 | MacPhail | 709/224 |
| 6,799,221 B1 * | 9/2004 | Kenner et al. | 709/245 |
| 6,834,372 B1 * | 12/2004 | Becker et al. | 715/501.1 |

* cited by examiner

USING A PROBABILITY ASSOCIATIVE MATRIX ALGORITHM TO MODIFY WEB PAGES

FIELD OF THE INVENTION

This invention relates generally to the field of electronic commerce, and more particularly pertains to a data mining technique used to predict navigating patterns of web site users.

BACKGROUND

With the increasing popularity of the Internet and World Wide Web, and the global penetration of the Internet, it has become common for businesses to set up on-line web-based systems such as Business-to-Customer (B2C) and Business-to-Business (B2B) models for marketing and selling goods and services to substantial audiences. On-line web sites enable businesses to creatively display and describe their products and services to customers using their web pages. Businesses can lay out web pages having content such as text, pictures, sound, and video using HyperText Markup Language (HTML). Customers, in turn, can access a business's web pages using a browser such as Microsoft Explorer or Netscape Navigator, installed on a client server connected to the web through an on-line service provider such as Microsoft Network or America on-line, and can place orders from an on-line product catalog, or obtain information of their choice from the business's web pages.

Due to the increasing popularity of the Internet and World Wide Web, web site development has become a serious business. One key element considered in any web site development is to provide user-friendly web pages. Users of the web site generally demand the right amount of information in the right amount of web site navigation time. Also, in general the promotion of business goods and services can directly depend on the effort put in to the development and management of the web sites. Therefore, it becomes essential in web site development and management to monitor, analyze, and understand user patterns of web site navigation. Knowing how, when, and for what purpose the web pages are being accessed can mean a difference between simply having a web site and building a user-friendly web site having a sound web strategy. Understanding how users navigate the web site promotes the business's goods and services. It can be critical to the business's success that users of their web site are provided with the right amount information in the right amount of web site navigation time.

Therefore, there is a need in the art for a technique that can aid in developing the user-friendly web sites by providing the right amount of information at the right amount of web site navigation time.

SUMMARY OF THE INVENTION

The present invention provides a system and a method for predicting future web navigation sequences of users visiting a web site. The system and method includes a web server having browsable web pages including products and services offered by a business. A web-monitoring tool monitors web navigation sequences performed by each user while browsing the web pages of the web site. A probability associative matrix (PAM) analyzer analyzes each of the monitored web navigation sequences to predict the web navigation sequences of future users visiting the web site. A web site administrator implements changes to the web site based on the analysis of the monitored web navigation sequences by the PAM analyzer to enhance the effectiveness of the web site in promoting business's goods and services.

Other aspects of the invention will be apparent on reading the following detailed description of the invention and viewing the drawings that form a part thereof.

DETAILED DESCRIPTION

This document describes a technique for predicting future web navigation sequences of users visiting a web site to enhance effectiveness of the web site, so that users are provided with the right amount of information within the right amount of web site navigation time. Also, the technique can be used to predict when, how, and what web pages the users are visiting. The technique can also be used to form user profiles based on the user navigation patterns. Further, the technique can be used to predict which web pages visited by the users will be most popular. Also, the technique can be used to predict technical problems and system bottle necks based on tracking the usage of the web site. This data mining technique can also be used to predict business patterns. The method and apparatus can be used to determine popular web navigation sequences, to find top entry and exit pages, to dynamically monitor and suggest modification to the web site, to improve server performance by placing popular web pages in a cache memory of user computers, to determine least used web pages, to improve access times of web pages, to attract and retain visitors, to fulfill visitor needs, to assess and personalize the presentation of the web pages based on user type and usage pattern, or in providing prompt responsiveness to visitors needs. The technique can also be useful in collecting E-commerce and/or marketing related information such as the number of hits a web page containing a certain ad is receiving, discovering customer profiles, and the number of completed transactions in a given time period. The technique can further be envisioned being used to provide personalized news and/or mail of interest to users.

Figure 1:
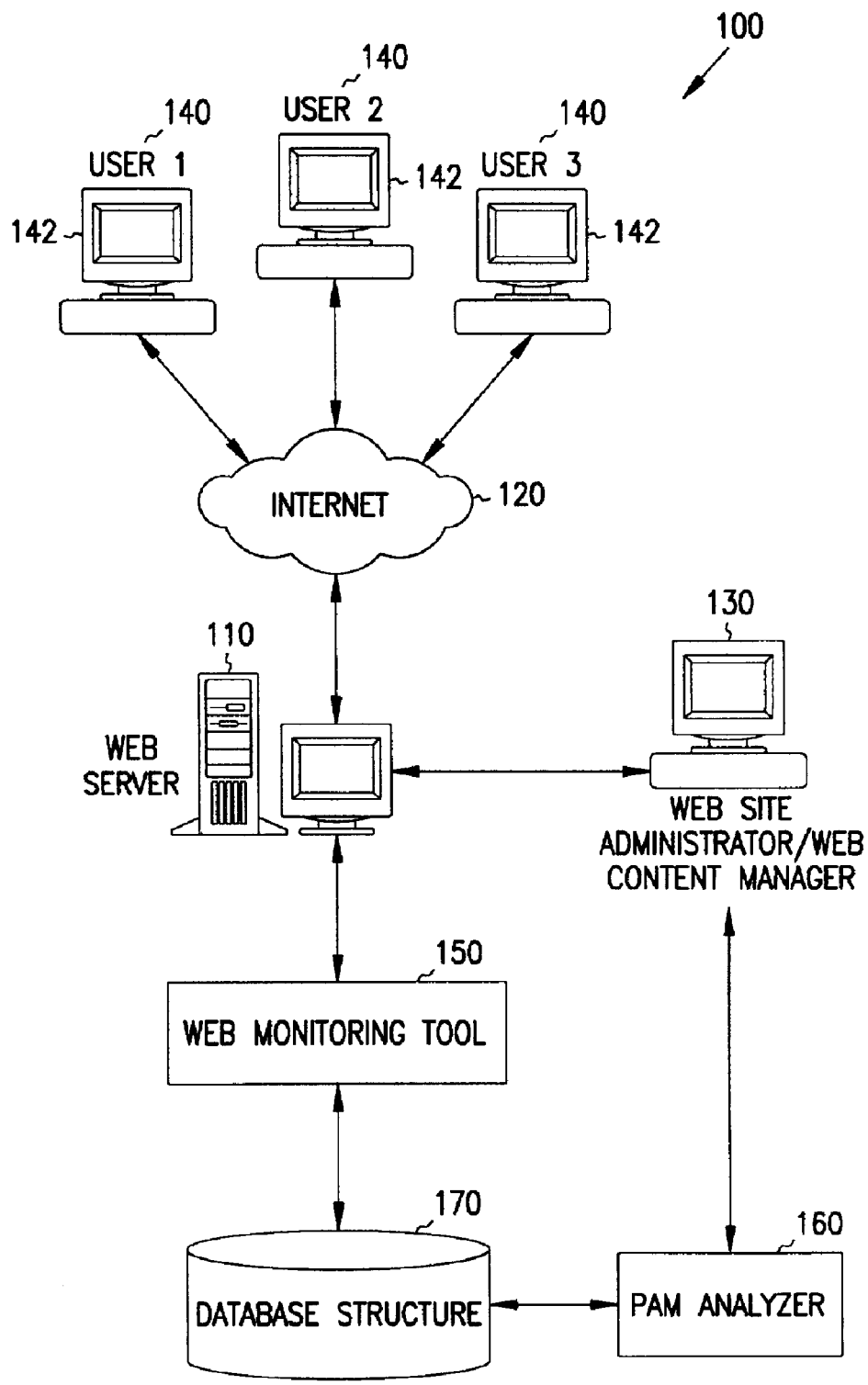
FIG. 1 illustrates an overview of one embodiment of a web site system according to the present invention.

FIG. 1 illustrates an overview of one embodiment of a computer implemented on-line web site system 100 according to the present invention. A web server 110 is connected to the Internet 120, and hosts the business's web pages. The term "web site" can include a node or domain on the Internet or other such interactive networks, that can be supported by a server generating web pages or processed by a web browser or equivalent. A web administrator and/or web content manager 130 maintains the business's web pages through the web server 110. The term "web administrator and/or web content manager" refers to firmware including software and/or hardware.

Users and/or visitors 140 are also connected to the Internet 120 via their computers 142. The web site system 100 allows the users 140 to electronically browse the web pages. The web pages display products and services offered by the business.

A web-monitoring tool 150 is connected to web site system 100 to monitor each of the web navigation sequences executed by each user while browsing the web pages provided by the web site. The web-monitoring tool 150 electronically monitors the web navigation sequences performed by each user visiting the web site. The web navigation sequences can include page shift sequences associated with each of the web navigation sequences. The page shift sequences can include users' navigating from a present page shift sequence to a next page shift sequence. The present page shift sequence can include monitoring the user navigating from a previous web page to a present web page. The next page shift sequence can include monitoring the user navigating from a present web page to a next web page.

A PAM analyzer 160 connected to the web administrator 130 and the web-monitoring tool through a database structure 170 analyzes each of the monitored web navigation sequences to predict web navigation sequences of future users visiting the web site. The database structure 170 stores each of the web navigation sequences performed by each user visiting the web site. The database structure 170 can also store the user navigation information.

The PAM analyzer 160 also analyzes each of the web navigation sequences to collect user navigation information such as age, web pages visited by the user, gender, or any other relevant information that could aid in further predicting the user navigating patterns of the web site. The PAM analyzer can also analyze each of the stored web navigation sequences to predict business patterns, and can also predict technical problems and system bottlenecks that could be experienced by the web site based on the user navigation patterns.

In some embodiments, the PAM analyzer 160 separates the web navigation sequences into the page shift sequences. Further, the PAM analyzer counts the number of occurrences of each page shift sequence from the separated page shift sequences. Then the PAM analyzer analyzes the counted number of occurrences of each page shift sequence to predict future user web site patterns. In some embodiments, the PAM analyzer computes probability of navigating from the present page shift sequence to the next page shift sequence based on the counted number of occurrences of each page shift sequence.

In some embodiments, the PAM analyzer predicts future user web navigation patterns using a two-dimensional probability associative matrix having N rows for each stored web navigation sequence and M columns including separated page shift sequences, number of counted occurrences of each of the page shift sequences, and probability of going from a present page shift sequence to a next page shift sequence to predict user patterns. The probability associative matrix can be used to analyze stored user navigation sequences and to filter out the most popular user navigation sequences. The technique consists of computing probabilities of going from a present page shift sequence to a next page shift sequence. In some embodiments, the probabilities of going from a present page shift sequence (one page shift sequence) to a next page shift sequence (another page shift sequence) is computed based on comparing the total number of times users visiting the present page shift sequence (a particular page shift sequence) to a total count of the times users going to the next page shift sequence (another particular page shift sequence) from the present page shift sequence (the particular page shift sequence). The following examples shown in FIGS. 2 and 3 illustrate in detail the above described technique of compiling the probability associative matrix using the stored web navigation sequences, and using the probability associative matrix for predicting future navigation patterns of the users visiting the web site 100.

Figure 2:
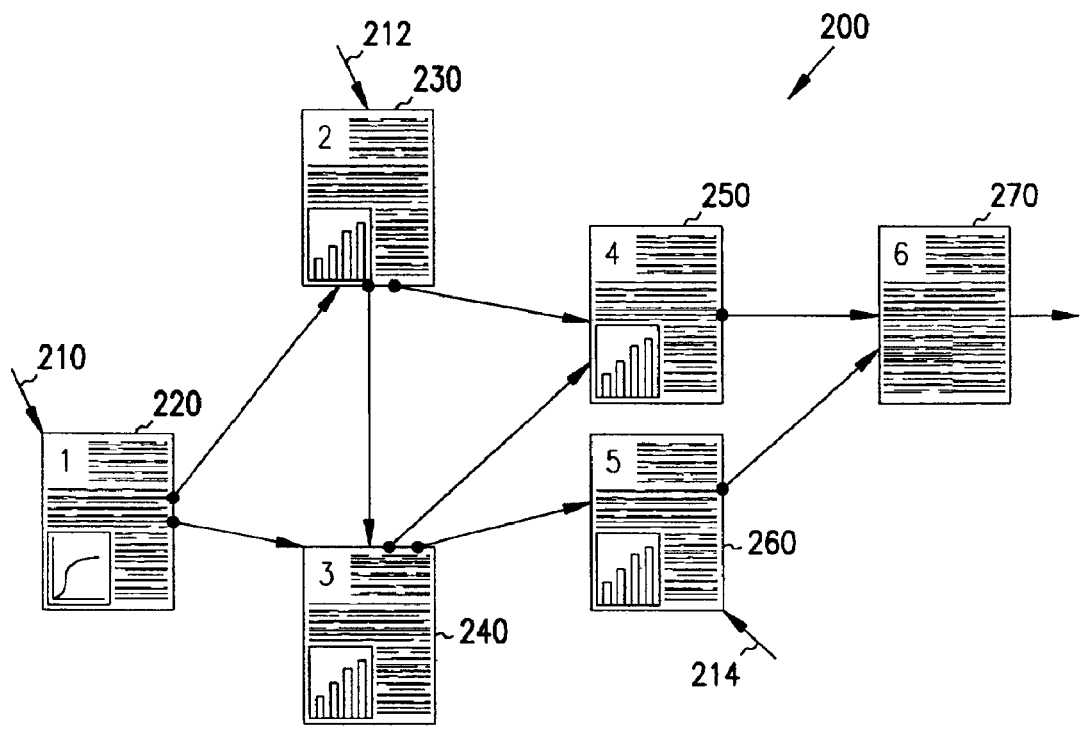
FIG. 2 illustrates one embodiment of a user navigation of the web site of FIG. 1.
Figure 3:
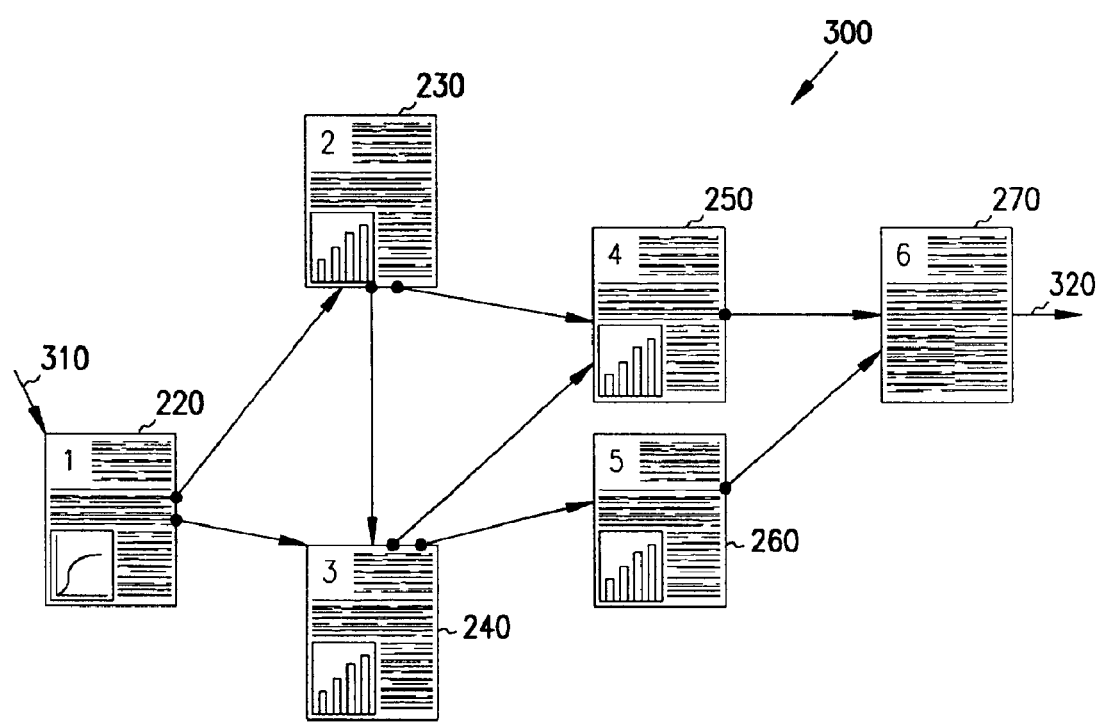
FIG. 3 illustrates another embodiment of the user navigation of the web site of FIG. 1.

FIGS. 2 and 3 illustrate example embodiments 200 and 300 of users 140 navigating the web site 100 shown in FIG. 1. As shown in FIGS. 2 and 3, users 140 can enter the web site 100 from different domains 210, 212, and 214. For example, users 140 can start from a home page 310 as shown in FIG. 3, or can start directly from other web pages 210, 212, and 214 as shown in FIG. 2 when a reference comes from a search engine. The users 140 can arrive at a web page 270 from different domains such as 210, 212, 214, and 310. Users 140 can also diverge to different paths and converge to a particular page such as 270, and users 140 can also enter the web site 100 at 310 and exit the web site 100 at 320 as shown in FIG. 3.

The PAM algorithm for predicting the future user navigation sequences of the web site 100 is further explained below using the example web navigation sequences of users 140 shown in FIGS. 2 and 3.

The PAM algorithm makes use of a two dimensional matrix having N rows and M columns. Depending on the sequences the number of rows will be increased dynamically. Whereas the number of columns can be fixed as shown below.

| Present shift sequence | Next shift sequence | Count 1 | Count 2 | Probability |
| --- | --- | --- | --- | --- |

Following are some example web navigation sequences (performed by users 140 entering the web site 100 shown in FIGS. 2 and 3) demonstrating the technique of computing probabilities associated with going from a present page shift sequence to a next page shift sequence using the probability associative matrix.

0>Page 1>Page 2>Page 3>Page 4>Page 5>Page 6>0

0>Page 1>Page 2>Page 4>Page 3>Page 5>Page 6>0

0>Page 1>Page 2>Page 3>Page 4>Page 6>0

0>Page 1>Page 2>Page 3>Page 5>Page 6>0

0>Page 1>Page 3>Page 4>Page 6>0

0>Page 2>Page 3>Page 4>Page 5>Page 6>0

Where '0' in the beginning and end of the above illustrated web navigation sequence indicates that the user is entering and exiting the web site 100 ('0' indicates user is out of the web site 100). Where as Pages 1 to 6 represent different web pages on the web site 100 accessed by the users 140 during their web navigation sequences. From the above example web navigation sequences, the present page and next page shift are separated, and the counts and probabilities are calculated as shown below in the following PAM matrix.

| Present shift sequence | Next shift sequence | Count 1 | Count 2 | Pr | Present shift sequence | Next shift sequence | Count 1 | Count 2 | Pr |
|---|---|---|---|---|---|---|---|---|---|
| 0,0 | 0,1 | 5 | 6 | 5/6 | 0,0 | 0,2 | 1 | 6 | 1/6 |
| 0,1 | 1,2 | 4 | 5 | 4/5 | 0,1 | 1,3 | 1 | 5 | 1/5 |
| 0,2 | 2,3 | 1 | 1 | 1 | | | | | |
| 1,2 | 2,3 | 3 | 4 | 3/4 | 1,2 | 2,4 | 1 | 4 | ¼ |
| 1,3 | 3,4 | 1 | 1 | 1 | | | | | |
| 2,3 | 3,4 | 3 | 4 | 3/4 | 2,3 | 3,5 | 1 | 4 | ¼ |
| 2,4 | 4,3 | 1 | 1 | 1 | | | | | |
| 3,4 | 4,5 | 2 | 4 | 2/4 | 3,4 | 4,6 | 2 | 4 | 2/4 |
| 3,5 | 5,6 | 2 | 2 | 1 | | | | | |
| 4,3 | 3,5 | 1 | 1 | 1 | | | | | |
| 4,5 | 5,6 | 2 | 2 | 1 | | | | | |
| 4,6 | 6,0 | 2 | 2 | 1 | | | | | |
| 5,6 | 6,0 | 3 | 3 | 1 | | | | | |

In the above table the present shift sequence indicates a user navigating from a previous page to a present page, and next shift sequence indicates user navigating from a present page to a next page. Count 1 indicates the number of occurrences of going from present page shift sequence to a next page sequence. Count 2 indicates the number of times a user visited the present page shift sequence.

For example, in the above table the event of going from the present page sequence [2,3] to the next page shift sequence [3,4], i.e., the user who is in Page 3 who has previously accessed Page 2 moved to Page 4, has occurred 3 times. The event of the user going from the present page shift sequence [2,3] to the next page shift sequence [3,5] has occurred 1 time. So the probability of going from the present page shift sequence [2,3] to the next page shift sequence [3,4] is ¾, where as probability of going from the present page shift sequence [2,3] to the next page shift sequence [3,5] is ¼.

The above table shows the computational technique used by PAM to determine the most popular web navigation patterns of users 140 visiting the web site. From the above table one can derive that most users 140 entered web page 1 from out side. Also, from the above table one can derive that most users 140 from web page 1 moved to web page 2. Further, the users 140 moved from the web page 1 and 2 to web page 3. From page shift sequence [3,4] the probability is the same for going either to web page 5 and then to web page 6, or directly to web page 6. Such most popular or least popular web page navigation sequences can be derived from the computed probabilities in the above illustrated probability associative matrix table.

The users 140 coming to web page 4 from web page 3 are equally likely to go to web page 5 or web page 6, since the probability associated with both the page shift sequences is ½. Based on this type of information, the web site administrator 130 can remove a direct link from web page 4 to web page 6 and can require the user to go thorough web page 5 to get to web page 6. Or alternatively, based on such conclusions, the web administrator 130 can alter the sequence in which web pages are presented to improve the performance of the web site 100 so that the web site 100 can present information to the users 140 in a more efficient way as desired by the users 140.

Figure 4:
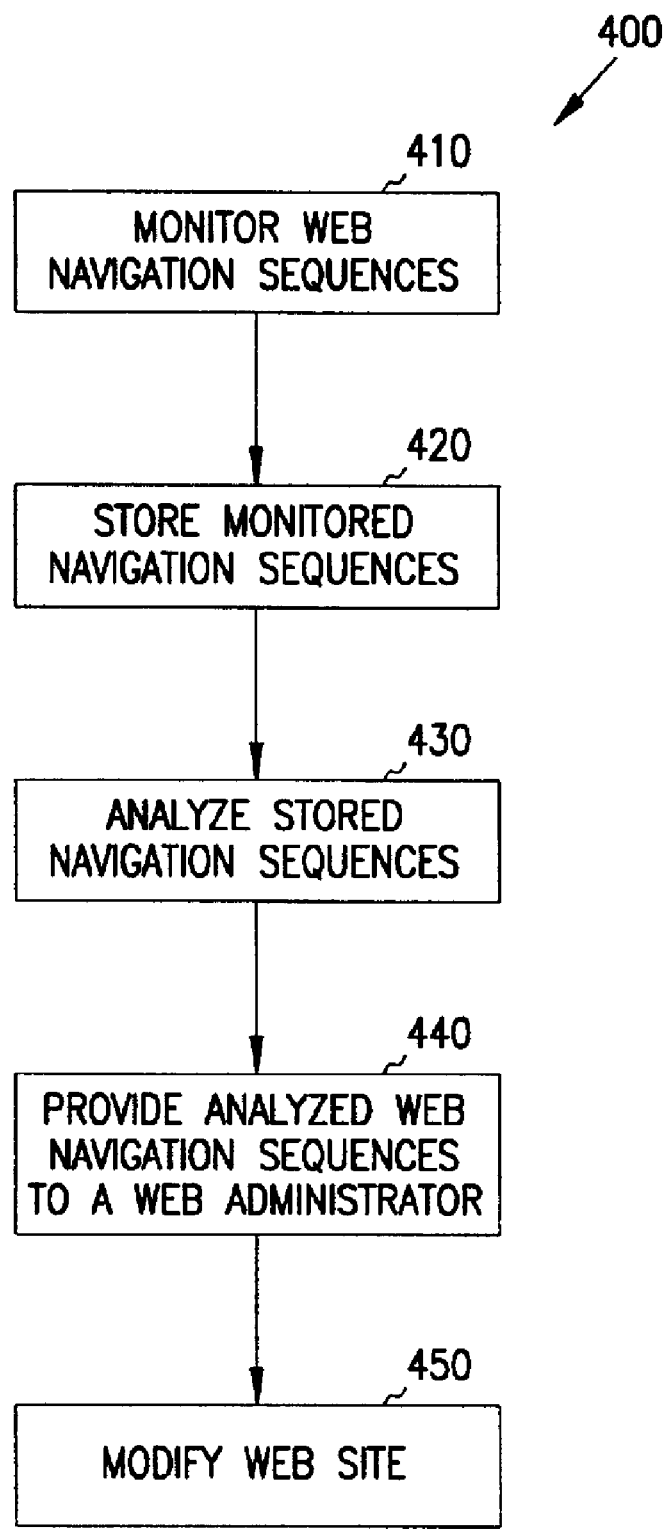
FIG. 4 illustrates overall operation of the embodiment shown in FIG. 1.

FIG. 4 illustrates an overview of one embodiment of the process 400 of the present invention. This process 400 provides, among other elements, as illustrated in element 410, a web site system including a web server which hosts the business's web pages. The web pages display goods and services offered by the business. At block 410, the web site system monitors each of the web navigation sequences performed by users browsing the web pages provided by the web site system. In some embodiments, the web site system electronically monitors the web navigation sequences performed by each user visiting the web site. The web navigation sequences can include page shift sequences associated with each of the web navigation sequences. The page shift sequences can include users' navigating from a present page shift sequence to a next page shift sequence. The present page shift sequence can include monitoring the user navigating from a previous web page to a present web page. The next page shift sequence can include monitoring the user navigating from a present web page to a next web page.

Element 420 stores the monitored web navigation sequences performed by users visiting the web site while browsing the web pages. In some embodiments, the web site system stores the monitored web navigation sequences within a database structure of the web site system.

Element 430 analyzes each of the stored web navigation sequences to predict future web navigation patterns of the web site. In some embodiments, the web site system analyzes the monitored web navigation sequences by separating the web navigation sequences into the page shift sequences. Further, the web site counts the number of occurrences of each page shift sequence from the separated page shift sequences. Then the web site analyzes the counted number of occurrences of each page shift sequence to predict the future user web site patterns. In some embodiments, the web site computes the probability of navigating from the present page shift sequence to the next page shift sequence based on using the counted number of occurrences of each page shift sequence.

In some embodiments, the web site system analyzes the web navigation sequences to predict future user web navigation patterns using a two-dimensional probability associative matrix including N rows for each stored web navigation sequence and M columns including separated page shift sequences, number of counted occurrences of each of the page shift sequences, and the probability of going from a present page shift sequence to a next page shift sequence to predict user patterns. The probability associative matrix can be used to analyze stored user navigation sequences and to filter out the most popular user navigation sequences. The technique consists of computing probabilities associated with going from a present page shift sequence to a next page shift sequence. In some embodiments, the probabilities associated with going from a present page shift sequence (one page shift sequence) to a next page shift sequence (another page shift sequence) is computed based on comparing the total number of times users visiting the present page shift sequence (a particular page shift sequence) to a total count of times users going to the next page shift sequence (another particular page shift sequence) from the present page shift sequence (the particular page shift sequence). The above described technique of compiling the probability associative matrix using the stored web navigation sequences was described in detail with reference to FIGS. 2 and 3.

The web site system can also analyze each of the web navigation sequences to collect user navigation information such as age, web pages visited by the user, ethnic background, gender, or any other relevant information that could aid in further predicting the user navigation patterns at the web site. The web site system can further be used to analyze each of the stored web navigation sequences to predict business patterns, and can also be used to predict technical problems and system bottlenecks that could be experienced by the web site based on the user navigation patterns.

Element 440 provides the analyzed web navigation sequences to a web administrator and/or web content manager. Element 450 modifies the web site based on the analyzed web navigation sequences to improve the performance of the web site so that the web site can present web pages to the users visiting the web site in a more efficient way.

CONCLUSION

The above-described Internet-based technique provides, among other things, a method and apparatus to predict future web navigation sequences and patterns of users visiting a web site to enhance the effectiveness of the web site usage by the users visiting the web site.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A method of predicting future web navigation sequences of users visiting a web site, comprising:

monitoring web navigation sequences performed by each user while browsing the web site;

storing the monitored web navigating sequences in a probability associative matrix that includes page shift sequences separated from the web navigating sequences;

analyzing the stored web navigation sequences to predict future user patterns; and modifying the web site based on the analyzed information to enhance the effectiveness of the web site usage by the users.

2. The method of claim 1, further comprising:

analyzing the stored web navigation sequences further to collect user information.

3. The method of claim 2, further comprising:

storing the predicted user patterns and the collected user navigating information within a database structure of the web site.

4. The method of claim 1, wherein monitoring the web navigation sequences of each user comprises:

monitoring the web navigation sequences of each user.

5. The method of claim 1, wherein navigating sequences comprises:

page shift sequences associated with each of the navigating sequences.

6. The method of claim 5, wherein monitoring each of the navigating sequences comprises:

monitoring page shift sequences associated with web navigation sequences.

7. The method of claim 6, wherein monitoring page shift sequences comprises:

monitoring each of the users navigating from a present page shift sequence to a next page shift sequence.

8. The method of claim 7, wherein the present page shift sequence comprises:

the user navigating from a previous web page to a present web page.

9. The method of claim 8, wherein the next page shift sequence comprises:

the user navigating from the present web page to a next web page.

10. The method of claim 9, wherein storing the monitored web navigation sequences comprises:

storing the page shift sequences associated with the web navigation sequences within the database structure of the web site.

11. The method of claim 10, wherein analyzing the stored web navigation sequences further comprises:

separating the page shift sequences from the stored page shifts associated with web navigation sequences;

counting the number of occurrences of each page shift sequence from the separated page shift sequences; and analyzing the counted number of occurrences to predict the future web site user patterns.

12. The method of claim 11, wherein analyzing the counted number of occurrences comprises:

computing a probability of navigating from the present page shift sequence to the next page shift sequence based on using the counted number of occurrences.

13. The method claim 12, wherein analyzing the web navigation sequences to predict user patterns comprises:

using the probability associative matrix algorithm based on a two dimensional matrix including N rows for each stored web navigation sequence and M columns including separated page shift sequences, number of counted occurrences of each of the page shift sequences, and the probability associated with each of the number of counted occurrences to predict future user patterns.

14. A computer-implemented on-line web site for predicting navigation sequences of users visiting a web site, comprising:

a web server including browsable web pages of the web site, wherein the web pages include products and services offered by the business;

a web-monitoring tool to monitor web navigation sequences performed by each user while browsing the web pages of the web site; and a PAM analyzer to analyze each of the monitored web navigation sequences to predict the web navigation sequences of future users visiting the web site.

15. The system of claim 14, further comprising:

a web site administrator to implement changes to the web site based on the analysis of the PAM analyzer.

16. The system of claim 15, further comprising:

a database structure to store web navigation sequences performed by each user visiting the web site.

17. The system of claim 16, wherein the PAM analyzer further analyzes the web navigation sequences to collect user navigation information.

18. The system of claim 17, wherein the database structure further stores collected user navigating information.

19. The system of claim 14, wherein the web-monitoring tool monitors the web navigation sequences of each user visiting the web site.

20. The system of claim 14, wherein each of the navigating sequences comprises:

page shift sequences.

21. The system of claim 20, wherein the PAM analyzer separates page shift sequences from the stored page shift sequences associated with each of the web navigation sequences, wherein the PAM analyzer further counts the number of occurrences of each page shift sequence from the separated page shift sequences, and then the PAM analyzer analyzes the counted number of occurrences to predict the future user web site navigation patterns.

22. The system of claim 21, wherein the PAM analyzer monitors each user's navigating from a present page shift sequence to a next page shift sequence.

23. The system of claim 22, wherein present page shift sequence comprises:

navigation from a previous web page to a present web page.

24. The system of claim 23, wherein next page shift sequence comprises:

navigation from a present web page to a next web page.

25. The system of claim 24, wherein the PAM analyzer computes a probability of navigating from the present page shift sequence to the next page shift sequence based on using the counted number of occurrences.

26. The system of claim 25, wherein the PAM analyzer includes:

a probability associative matrix algorithm based on a two dimensional matrix including N rows for each stored web navigation sequence and M columns including separated page shift sequences, number of counted occurrences of each of the page shift sequence, and probability associated with each of the number of counted occurrences to predict user patterns.

27. A method of predicting future web navigation sequences of users visiting a web site, comprising:

monitoring web navigation sequences performed by each user while browsing the web site;

storing the monitored web navigating sequences in a probability associative matrix that includes page shift sequences separated from the web navigating sequences, and also includes a probability associated with each page shift sequence;

analyzing the stored web navigation sequences to predict future user patterns; and modifying the web site to remove links to pages from a page based on the probabilities associated with the page shift sequences to enhance the effectiveness of the web site usage by the users.

* * * * *